United States Patent
Krishnamurthy

(10) Patent No.: US 9,454,632 B1
(45) Date of Patent: Sep. 27, 2016

(54) CONTEXT SPECIFIC SPARE CELL DETERMINATION DURING PHYSICAL DESIGN

(71) Applicant: Apple Inc., Cupertino, CA (US)

(72) Inventor: Harsha Krishnamurthy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 14/599,177

(22) Filed: Jan. 16, 2015

(51) Int. Cl.
*G06F 17/50* (2006.01)
*H01L 27/02* (2006.01)

(52) U.S. Cl.
CPC ....... *G06F 17/5072* (2013.01); *H01L 27/0207* (2013.01)

(58) Field of Classification Search
CPC .................... G06F 17/5068; H01L 27/0207
USPC .................................................. 716/118, 119
See application file for complete search history.

(56) References Cited

U.S. PATENT DOCUMENTS

| | | | |
|---|---|---|---|
| 5,623,420 A * | 4/1997 | Yee ..................... | G06F 17/5068 716/120 |
| 8,266,566 B2 | 9/2012 | Hopkins et al. | |
| 8,775,998 B2 | 7/2014 | Morimoto et al. | |
| 2005/0172253 A1 | 8/2005 | Osanai | |
| 2008/0029786 A1 * | 2/2008 | Fan ..................... | H01L 27/0207 257/209 |
| 2008/0224321 A1 * | 9/2008 | Jinno .................. | H01L 27/0207 257/773 |

OTHER PUBLICATIONS

Modi et al, "Eco-Map: Technology Remapping for Post-Mask ECO Using Simulated Annealing", IEEE International Conference on Computer Design, Oct. 15, 2008, 6 pages, IEEE, Lake Tahoe, CA.

* cited by examiner

*Primary Examiner* — Sun Lin
(74) *Attorney, Agent, or Firm* — Meyertons, Hood, Kivlin, Kowert & Goetzel, P.C.; Neal E. Persky; Lawrence J. Merkel

(57) ABSTRACT

In some embodiments, a method may be directed towards contextual based spare cell assignment for integrated circuits. The method may include reserving a plurality of spare cell areas in which to position spare cells on an integrated circuit. The method may include positioning standard cells as defined by an integrated circuit design for the integrated circuit. In some embodiments, the method may include determining the spare cells to be positioned in the plurality of spare cell areas based upon a population of a plurality of types of cells in a predetermined area. The method may include ensuring that each of the plurality of spare cell areas may include a minimum number of predetermined cells. The method may include positioning a predetermined cell in at least one of the plurality of spare cell areas if the type of predetermined cells is absent in the population of areas adjacent to the predetermined area.

17 Claims, 3 Drawing Sheets

CONTEXT SPECIFIC SPARE CELL DETERMINATION DURING PHYSICAL DESIGN

BACKGROUND

1. Technical Field

Embodiments described herein relate to semiconductor devices and methods for semiconductor device design. More particularly, some embodiments disclosed herein relate to methods of assigning spare cells on a semiconductor device based upon the distribution of cell types adjacent to the spare cells.

2. Description of the Related Art

Integrated circuits are used for a wide variety of electronic applications. An integrated circuit (IC) chip can be thought of as a collection of logic cells with electrical interconnections between the cells, formed on a semiconductor substrate. An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells.

Additional spare gates (standard cells) are inserted in VLSI designs (semiconductor chips) in pre-determined locations of the floorplan database for each block. The types of spare cells are also pre-determined (to cover a certain percentage/ratio of various logic cell types). Typically during the floor planning step or initial setup of the floorplan database of the design process, spare cells are inserted to cover the entire floorplan database. These spare cells are used later in the project phase to either perform very late ECOs (Engineering Change Orders) using these cells and reconnecting the wires OR after initial tape-out to make 'metal only' type of ECO/fixes for bugs and/or speed paths and/or race conditions.

The observation here is that by inserting a pre-determined set of types of logic cells, one does not have the right 'type' of cells in many cases to implement complex ECOs in certain parts of the design because certain parts of the design may use a certain (or certain types) of logic cells more than others.

SUMMARY

In some embodiments, a method may be directed towards contextual based spare cell assignment for integrated circuits. The method may include reserving a plurality of spare cell areas in which to position spare cells on an integrated circuit. The method may include positioning standard cells as defined by an integrated circuit design for the integrated circuit. In some embodiments, the method may include determining the spare cells to be positioned in the plurality of spare cell areas based upon a population of a plurality of types of cells in a predetermined area. The method may include ensuring that each of the plurality of spare cell areas may include a minimum number of predetermined cells. The method may include positioning a predetermined cell in at least one of the plurality of spare cell areas if the type of predetermined cells is absent in the population of areas adjacent to the predetermined area.

BRIEF DESCRIPTION OF THE DRAWINGS

The following detailed description makes reference to the accompanying drawings, which are now briefly described.

Figure 1A:
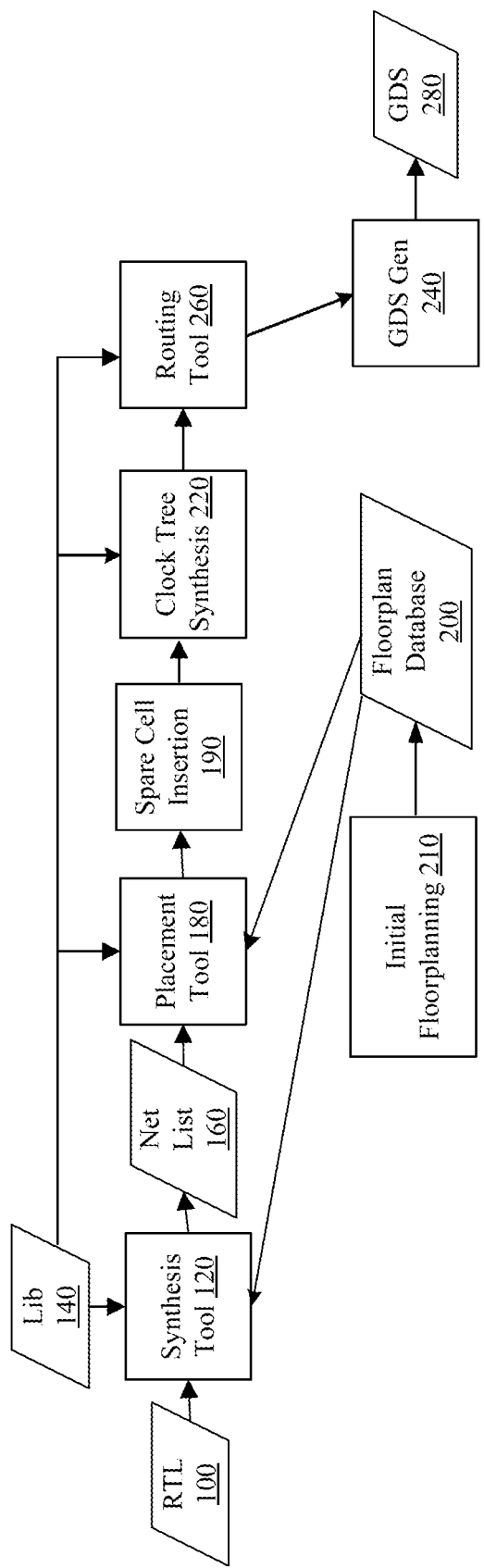
FIG. 1A depicts an embodiment of a block diagram illustrating a methodology for designing an integrated circuit.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In some embodiments, a method may be directed towards contextual based spare cell assignment for integrated circuits. The method may include reserving a plurality of spare cell areas in which to position spare cells on an integrated circuit. Reserving a plurality of spare cell areas in which to position spare cells on an integrated circuit may be accomplished during a design phase of the integrated circuit.

Turning now to FIG. 1A, a block diagram illustrating one embodiment of a methodology for designing an integrated circuit is depicted. The methodology begins with a register transfer level (RTL) description of the logic of the integrated circuit (reference numeral 100). The RTL description (100) is input to a synthesis tool (120), which also has access to a library (140) of predesigned circuit "cells". The RTL description (100) may be expressed in any hardware description language (HDL) such as Verilog, Very High Speed Integrated Circuit Hardware Description Language (VHDL), etc. The RTL description (100) may be a behavioral level description if the synthesis tool (120) is a behavioral synthesis tool. The output of the synthesis tool (120) may be a net list (160), which may be a list of instances of the cells from the library (140) and the connection between the cell instances that realizes the RTL description (100). The connection may be expressed using the same signal name between a given output pin of a cell and the input pin(s) of other cells to which the output pin is connected. The net list (160) may further include instances of a custom circuit design created by the designer and not included in the library (140) for general use. The custom circuits may be directly instantiated in the RTL (100) and may not be changed by the synthesis tool (120). Additionally, a floorplan database (200) may be developed with a floorplan database tool (not shown). The floorplan database (200) may be developed, e.g., based on the blocks into which the integrated circuit is divided and their expected areas and/or geometric shape on the integrated circuit.

Additionally, a floorplan database (200) may be developed with a floorplan database tool (not shown). The floorplan database (200) may be developed, e.g., based on the blocks into which the integrated circuit is divided and their expected areas and/or geometric shape on the integrated circuit.

The net list (160) and the floorplan database (200) may be input to a placement tool (180), which may determine a physical arrangement of the cells/circuits on the surface of a semiconductor substrate which will form the integrated circuit when manufactured. The placement tool (180) may receive description from the library (140) of the size of each cell (x and y directions) and the location of input and output pins on each cell. The placement tool (180) may take into account which pins of each cell instance are coupled to which pins of other cell instances in making the placement, as well as the overall dimensions of the integrated circuit (or the block within the integrated circuit, if the RTL description (100) is for less than the entire integrated circuit). The placement tool (180) may assign a placement location of standard cells and saves the assigned placement location in the physical design database (e.g., annotating placement information—location co-ordinates and cell orientation for each standard cell). In some embodiments, the placement tool (180) may include insertion of spare cells (190). In some embodiments, placement of the spare cells may be determined by the floorplan database (200). The physical design database (200) may have information of placement of standard cells, floorplan information, macro cells, and/or power grid may be passed on to clock tree synthesis (220). Clock tree synthesis (220) may insert and resize cells for clock distribution and update the physical design database (200). Clock tree synthesis (220) stage may route the clock nets in the design. The clock tree synthesis tool may synthesize the clock circuits for the integrated circuit and may insert them into the physical design database (200).

The physical design database (200) as updated by the clock tree synthesis tool (220) may be input to the routing tool (260) (or more simply "router" (260)). In some embodiments, the router (260) may generate descriptions of the metal layers for the integrated circuit, connecting output pins to input pins as specified by the net list (160). The output of the routing tool (260) may further update the physical design database (200). Once the design is complete, the updated physical design database 200 may be ultimately provided to a graphic data system (GDS) generator (240), which may generate the GDS description (280) of the integrated circuit. The GDS description (280) may be transmitted to the foundry that manufactures the integrated circuit. The information in the GDS description (280) may be used for mask fabrication and other processing at the foundry to produce the integrated circuit.

The router (260) may generally determine the routing for each net specified in the net list (160). A net may be one conductor on which a signal output by a cell/circuit is communicated to one or more input pins of one or more other cells/circuits. The net may include multiple end points (one output and multiple inputs, or even multiple output pins if the cells are controlled to avoid contention). The net may also include conductors at more than one metal layer in the integrated circuit, as well as vias between the layers, etc. The conductors may also be referred to as wires.

Figure 1B:
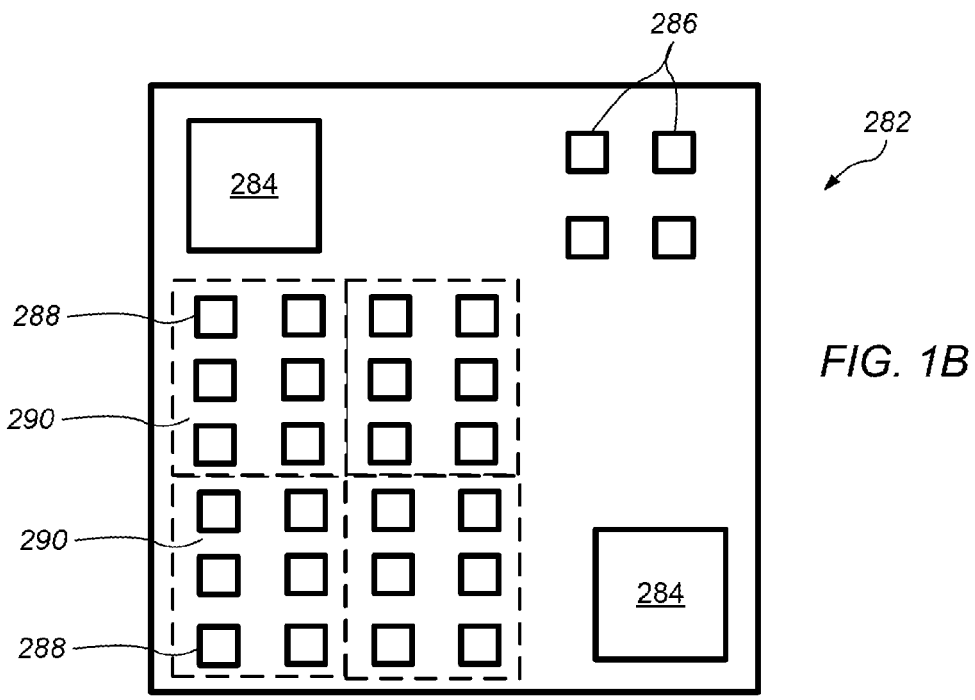
FIG. 1B depicts an embodiment of a block diagram of an integrated circuit.
Figure 2:
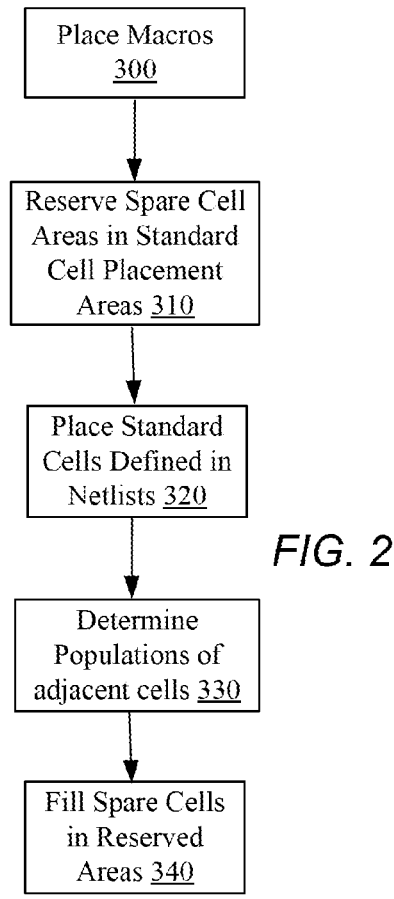
FIG. 2 depicts an embodiment of a block diagram illustrating a methodology for initial floorplanning during designing an integrated circuit.

In some embodiments, placement of the spare cells may be determined by the floorplan database (200). FIG. 1B depicts an embodiment of a block diagram of an integrated circuit 282. The integrated circuit 282 may include cache 284. Floorplan database (200) used to design the integrated circuit 282 may be determined by an initial floorplanning stage (210). FIG. 2 depicts an embodiment of a block diagram illustrating a methodology for initial floorplanning (210) during designing an integrated circuit. Initial floorplanning (210) may include placing macros (300). Upon initial placement of macros (300) initial floorplanning (210)

may include reserving spare cell areas (e.g., spare cell areas 286 depicted in FIG. 1B in integrated circuit 282) (310) in standard cell placement areas. Standard cells (e.g., standard cells 288 depicted in FIG. 1B in integrated circuit 282) defined in the netlist (160) may be placed in the initial floorplanning (210).

In some embodiments, upon placement of standard cells in the initial floorplanning (210) a population of adjacent cells (330) which are adjacent to the placed standard cells is determined. In some embodiments, the types of spare cells to be positioned in the plurality of spare cell areas are determined by a population of a plurality of types of cells in a predetermined area. Once the types and amounts of each type of spare cells are determined, the spare cells are placed (340) in the previously reserved spare cell areas.

Figure 3:
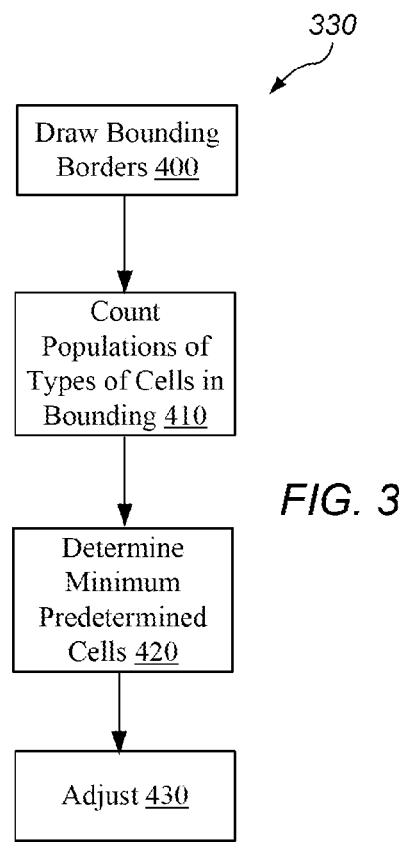
FIG. 3 depicts an embodiment of a block diagram illustrating a methodology for determining populations of adjacent cells during designing an integrated circuit.

The populations of the adjacent cells (330) may be determined. In some embodiments, a population may include a type and number of standard cells. FIG. 3 depicts an embodiment of a block diagram illustrating a methodology for determining populations of adjacent cells (330) during designing an integrated circuit. Determining populations of standard cells may include scanning the entire floorplan database and dividing the floorplan database into different regions. In some embodiments, the regions may be of equivalent size based upon the size/shape of the floorplan database. In some embodiments, the regions may be of a standard size irrespective of the specific attributes of the floorplan. In some embodiments, the regions may be sized differently within a floorplan based upon various features of the floorplan (e.g., size of the regions may be based upon the number of standard cells such that the regions are sized such that each region includes a substantially equivalent number of standard cells).

In some embodiments, dividing a floorplan database into regions may include scanning the floorplan database in bounding borders (400). Within the bounding boxes (e.g., bounding boxes or predetermined regions 290 depicted in FIG. 1B in integrated circuit 282) the ratio or distribution of standard cell logic types/families is identified. Each type of standard cell may be identified within the bounding box. The number of each type of standard cell within the bounding box may be determined. In some embodiments, the number and type of spare cells to be interested into the floorplan database may be determined based upon the standard cell type distribution assessed in each bounding box (410). It should be noted that typically bounding boxes as discussed herein are theoretical boundaries used during the planning stages of the floorplan database.

In some embodiments, a method may include determining if at least a predetermined number of each of at least one type of spare cell is positioned in a predetermined area (420) (e.g., the area within the bounding box). The predetermined number may be determined based upon the type of integrated circuit and/or the ultimate use of the integrated circuit. The types of standard cells for which predetermined numbers are assigned may be determined based upon the type of integrated circuit and/or the ultimate use of the integrated circuit.

In some embodiments, if it is determined that less than the predetermined number of each type of spare cells is not positioned in the predetermined area then enough of the deficient spare cell type are positioned in the predetermined area such that at least the predetermined number or minimum number of the spare cell is positioned in the predetermined area after the number is adjusted (430).

Types of spare cell include different types of logic gates. In some embodiments, logic gates may include, but are not limited to, AND, OR, NOT (invert), NAND, NOR, XOR, or XNOR logic gates.

In certain embodiments, one or more process steps described herein may be performed by one or more processors (e.g., a computer processor) executing instructions stored on a non-transitory computer-readable medium. For example, process 210, shown in FIG. 2 may have one or more steps performed by one or more processors executing instructions stored as program instructions in a computer readable storage medium (e.g., a non-transitory computer readable storage medium).

Figure 4:
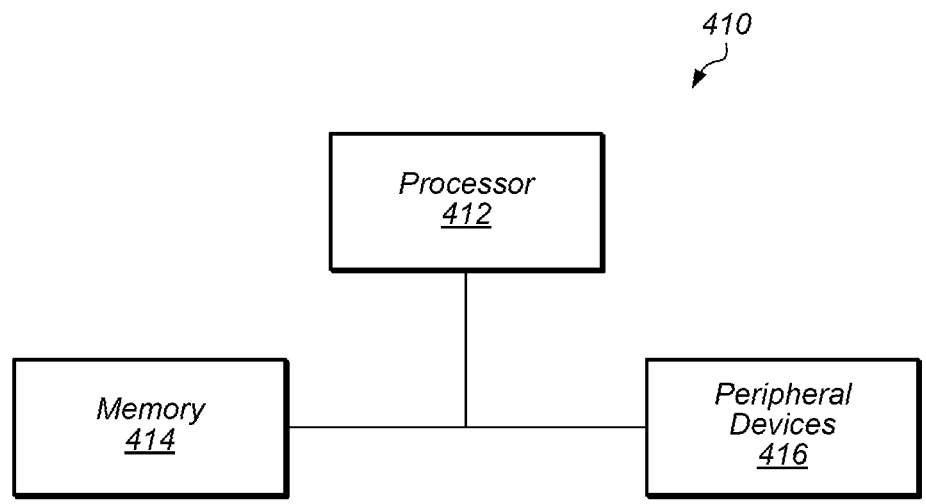
FIG. 4 depicts a block diagram of one embodiment of an exemplary computer system.

FIG. 4 depicts a block diagram of one embodiment of exemplary computer system 410. Exemplary computer system 410 may be used to implement one or more embodiments described herein. In some embodiments, computer system 410 is operable by a user to implement one or more embodiments described herein such as process 210, shown in FIG. 2. In the embodiment of FIG. 4, computer system 410 includes processor 412, memory 414, and various peripheral devices 416. Processor 412 is coupled to memory 414 and peripheral devices 416. Processor 412 is configured to execute instructions, including the instructions for process 210, which may be in software. In various embodiments, processor 412 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 410 may include more than one processor. Moreover, processor 412 may include one or more processors or one or more processor cores.

Processor 412 may be coupled to memory 414 and peripheral devices 416 in any desired fashion. For example, in some embodiments, processor 412 may be coupled to memory 414 and/or peripheral devices 416 via various interconnect. Alternatively or in addition, one or more bridge chips may be used to coupled processor 412, memory 414, and peripheral devices 416.

Memory 414 may comprise any type of memory system. For example, memory 414 may comprise DRAM, and more particularly double data rate (DDR) SDRAM, RDRAM, etc. A memory controller may be included to interface to memory 414, and/or processor 412 may include a memory controller. Memory 414 may store the instructions to be executed by processor 412 during use, data to be operated upon by the processor during use, etc.

Figure 5:
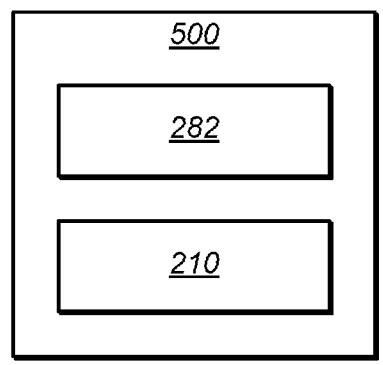
FIG. 5 depicts a block diagram of one embodiment of a computer accessible storage medium.

Peripheral devices 416 may represent any sort of hardware devices that may be included in computer system 410 or coupled thereto (e.g. storage devices, optionally including computer accessible storage medium 500, shown in FIG. 5, other input/output (I/O) devices such as video hardware, audio hardware, user interface devices, networking hardware, etc.).

Turning now to FIG. 5, a block diagram of one embodiment of computer accessible storage medium 500 including one or more data structures representative of one or more code sequences representative of process 210 (depicted in FIG. 2) is shown, such as code sequence 282 and code sequence 210. Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method of contextual based spare cell assignment for integrated circuits, comprising:
    reserving a plurality of spare cell areas to position spare cells on an integrated circuit;
    positioning standard cells as defined by an integrated circuit design for the integrated circuit;
    determining the spare cells to be positioned in the plurality of spare cell areas based upon a population of a plurality of types of cells in a predetermined area; and
    positioning a minimum number of predetermined cells in each of the plurality of spare cell areas.

2. The method of claim 1, further comprising determining the predetermined area by drawing a theoretical bounding box around groupings of standard cells.

3. The method of claim 2, further comprising determining a population of a plurality of types of cells in the theoretical bounding box.

4. The method of claim 1, further comprising positioning a predetermined cell in at least one of the plurality of spare cell areas if the type of predetermined cells are absent in the population of areas adjacent to the predetermined area.

5. The method of claim 1, further comprising drawing a theoretical bounding box around each of the plurality of spare cell areas and determining the population in the bounding box.

6. The method of claim 1, further comprising determining if at least a predetermined number of each of at least one type of spare cell is positioned in the predetermined area and if less than the predetermined number is positioned in the predetermined area then additional of the at least one type of spare cells are positioned in the predetermined area such that at least the predetermined number of the at least one type of spare cell is positioned in the predetermined area.

7. A non-transitory computer readable storage medium including program instructions that, when executed by one or more processors of a computer system, cause the one or more processors to perform a method comprising:
    reserving a plurality of spare cell areas to position spare cells on an integrated circuit;
    positioning standard cells as defined by an integrated circuit design for the integrated circuit;
    determining the spare cells to be positioned in the plurality of spare cell areas based upon a population of a plurality of types of cells in a predetermined area; and
    positioning a minimum number of predetermined cells in each of the plurality of spare cell areas.

8. The non-transitory computer readable storage medium of claim 7, further comprising determining the predetermined area by drawing a theoretical bounding box around groupings of standard cells.

9. The non-transitory computer readable storage medium of claim 8, further comprising determining a population of a plurality of types of cells in the theoretical bounding box.

10. The non-transitory computer readable storage medium of claim 7, further comprising positioning a predetermined cell in at least one of the plurality of spare cell areas if the type of predetermined cells are absent in the population of areas adjacent to the predetermined area.

11. The non-transitory computer readable storage medium of claim 7, further comprising drawing a theoretical bounding box around each of the plurality of spare cell areas and determining the population in the bounding box.

12. The non-transitory computer readable storage medium of claim 7, further comprising determining if at least a predetermined number of each of at least one type of spare cell is positioned in the predetermined area and if less than the predetermined number is positioned in the predetermined area then additional of the at least one type of spare cells are positioned in the predetermined area such that at least the predetermined number of the at least one type of spare cell is positioned in the predetermined area.

13. An integrated circuit, comprising:
    standard cells positioned on an integrated circuit according to an integrated circuit design;
    a plurality of spare cell areas reserved on the integrated circuit; and
    spare cells positioned in at least some of the plurality of spare cell areas based upon a population of a plurality of types of cells in a predetermined area, wherein a minimum number of predetermined cells are positioned in each of the plurality of spare cell areas.

14. The integrated circuit of claim 13, wherein the predetermined area is determined by drawing a theoretical bounding box around groupings of standard cells.

15. The integrated circuit of claim 14, wherein a population of a plurality of types of cells in the theoretical bounding box is determined.

16. The integrated circuit of claim 13, wherein a predetermined cell is positioned in at least one of the plurality of spare cell areas if the type of predetermined cells are absent in the population of areas adjacent to the predetermined area.

17. The integrated circuit of claim 13, wherein if at least a predetermined number of each of at least one type of spare cell is positioned in the predetermined area and if less than the predetermined number is positioned in the predetermined area then additional of the at least one type of spare cells are positioned in the predetermined area such that at least the predetermined number of the at least one type of spare cell is positioned in the predetermined area.

* * * * *